(12) United States Patent
Eckelberry

(10) Patent No.: US 6,435,536 B2
(45) Date of Patent: *Aug. 20, 2002

(54) OPERATING SYSTEM FOR LOCKING PINS FOR SLIDING UNDERCARRIAGES

(75) Inventor: Jim Eckelberry, Canton, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/829,755

(22) Filed: Apr. 10, 2001

Related U.S. Application Data

(63) Continuation of application No. 09/111,497, filed on Jul. 8, 1998, now Pat. No. 6,213,489.

(51) Int. Cl.$^7$ .............................................. B60D 3/022
(52) U.S. Cl. .............................. 280/407.1; 280/149.2; 180/209
(58) Field of Search ..................... 280/149.2, 405.1, 280/407.1; 180/209

(56) References Cited

U.S. PATENT DOCUMENTS

| | | | |
|---|---|---|---|
| 2,935,332 A | 5/1960 | Delay .......................... | 280/81 |
| 2,967,051 A | 1/1961 | Mobley ....................... | 261/142 |
| 3,146,000 A | 8/1964 | Holzman ..................... | 280/81 |
| 3,177,002 A | 4/1965 | Schmidt ....................... | 280/81 |
| 3,181,887 A | 5/1965 | Boylan et al. ............... | 280/421 |
| 3,365,211 A | 1/1968 | Ginsburg ..................... | 280/81 |
| 3,372,946 A | 3/1968 | Hutchens ..................... | 280/81 |
| 3,391,950 A | 7/1968 | Carter et al. ................. | 280/421 |
| 3,618,969 A | 11/1971 | Glassmeyer ................. | 280/80 |
| 3,628,811 A | 12/1971 | Rivers ......................... | 280/421 |
| 3,653,686 A | 4/1972 | Roesies ....................... | 280/421 |
| 3,711,122 A | 1/1973 | Holmberg et al. .......... | 280/421 |
| 3,719,372 A | 3/1973 | Rawlings ..................... | 280/421 |
| 3,778,079 A | 12/1973 | Vornberger et al. ........... | 280/80 |
| 4,132,326 A | 1/1979 | Pinto ........................... | 214/515 |
| 4,273,347 A * | 6/1981 | Hulse ....................... | 280/405.1 |
| 4,286,797 A | 9/1981 | Mekosh, Jr. et al. .......... | 280/80 |
| 4,353,565 A | 10/1982 | Smith et al. .................. | 280/80 |
| 4,635,742 A | 1/1987 | Bertolini ..................... | 180/209 |
| 4,641,846 A | 2/1987 | Ehrhart ........................ | 280/80 |

(List continued on next page.)

FOREIGN PATENT DOCUMENTS

WO        8501920     *  5/1985    .............. 280/149.2

*Primary Examiner*—Brian L. Johnson
*Assistant Examiner*—Bryan Fischmann
(74) *Attorney, Agent, or Firm*—Carlson, Gaskey & Olds

(57) ABSTRACT

A operating system for slider locking pins includes an air compressor connected to an air supply tank. An air pressure protection valve is connected to the air tank to protect the brake system of the trailer. A flipper valve is connected to the air pressure protection valve and provides selective fluid communication between the air tank and a plurality of locking pin driver assemblies. Each locking pin driver assembly is adapted to move a locking pin to a disengaged position when in fluid communication with the air tank while being adapted to move the locking pin to the engaged position when not in fluid communication with the air tank. Each driver assembly is configured to substantially provide protection to each of its elements from adverse weather conditions and articles thrown up from the road. In one embodiment, the driver assembly includes a fixed bracket attached to the frame of the sliding undercarriage. A traveling bracket is connected to a locking pin. A return spring is disposed about locking pin and disposed to create a constant force driving the locking pin to the engaged position. An expandable air bladder is disposed between the fixed bracket and the traveling bracket. The expandable bladder is in fluid communication with the flipper valve such that when the flipper valve is manipulated to provide fluid communication between the air bladder and the air tank, the air bladder expands driving the locking pin to the disengaged position.

21 Claims, 14 Drawing Sheets

U.S. PATENT DOCUMENTS

| | | | |
|---|---|---|---|
| 4,660,843 A | 4/1987 | Hicks | 280/80 |
| 4,838,566 A | 6/1989 | Baxter et al. | 280/149.2 |
| 4,838,578 A | 6/1989 | Baxter | 280/149.2 |
| 4,907,815 A | 3/1990 | Hunger | 280/435 |
| 4,944,522 A | 7/1990 | Hart | 280/149.2 |
| 4,958,845 A | 9/1990 | Parks | 280/407.1 |
| 4,993,737 A | 2/1991 | Torcomian | 280/407 |
| 5,067,740 A | 11/1991 | Christenson | 280/405.1 |
| 5,069,472 A | 12/1991 | Parr et al. | 280/433 |
| 5,137,296 A | 8/1992 | Forman | 280/407.1 |
| 5,199,732 A | 4/1993 | Lands et al. | 280/407.1 |
| 5,232,234 A | 8/1993 | McCombs | 280/80.1 |
| 5,314,201 A | 5/1994 | Wessels | 280/407.1 |
| 5,314,233 A | 5/1994 | Bostrom et al. | 297/217 |
| 5,346,233 A | 9/1994 | Moser | 280/149.2 |
| 5,449,187 A | 9/1995 | Schueman | 280/149.2 |
| 5,451,069 A | 9/1995 | Schueman | 280/149.2 |
| 5,460,237 A | 10/1995 | Schueman | 180/209 |
| 5,462,301 A | 10/1995 | Schueman | 280/149.2 |
| 5,465,577 A | 11/1995 | Schulte-Werning | 60/722 |
| 5,465,990 A | 11/1995 | Wessels | 280/407.1 |
| 5,474,149 A | 12/1995 | Schueman | 180/209 |
| 5,476,277 A | 12/1995 | Schueman | 280/149.2 |
| 5,480,098 A | 1/1996 | Doppstadt | 241/101.76 |
| 5,480,171 A | 1/1996 | Cheffey | 280/149.2 |
| 5,507,511 A | 4/1996 | Schueman | 280/149.2 |
| 5,531,467 A | 7/1996 | Schueman | 280/149.2 |
| 5,564,725 A | 10/1996 | Brazeal | 280/149.2 |
| 5,564,727 A | 10/1996 | Wessels | 280/407.1 |
| 5,620,195 A | 4/1997 | Wessels | 280/149.2 |
| 5,642,896 A | 7/1997 | Pierce et al. | 280/149.2 |
| 5,716,071 A * | 2/1998 | Stanley et al. | 280/407.1 |
| 5,720,489 A * | 2/1998 | Pierce et al. | 280/149.2 |
| 5,758,890 A * | 6/1998 | Wessels | 280/149.2 |
| 5,833,253 A * | 11/1998 | Hess | 280/149.2 |
| 6,213,489 B1 * | 4/2001 | Eckelberry | 280/407.1 |
| 6,279,933 B1 * | 5/2001 | Ross et al. | 280/149.2 |

* cited by examiner

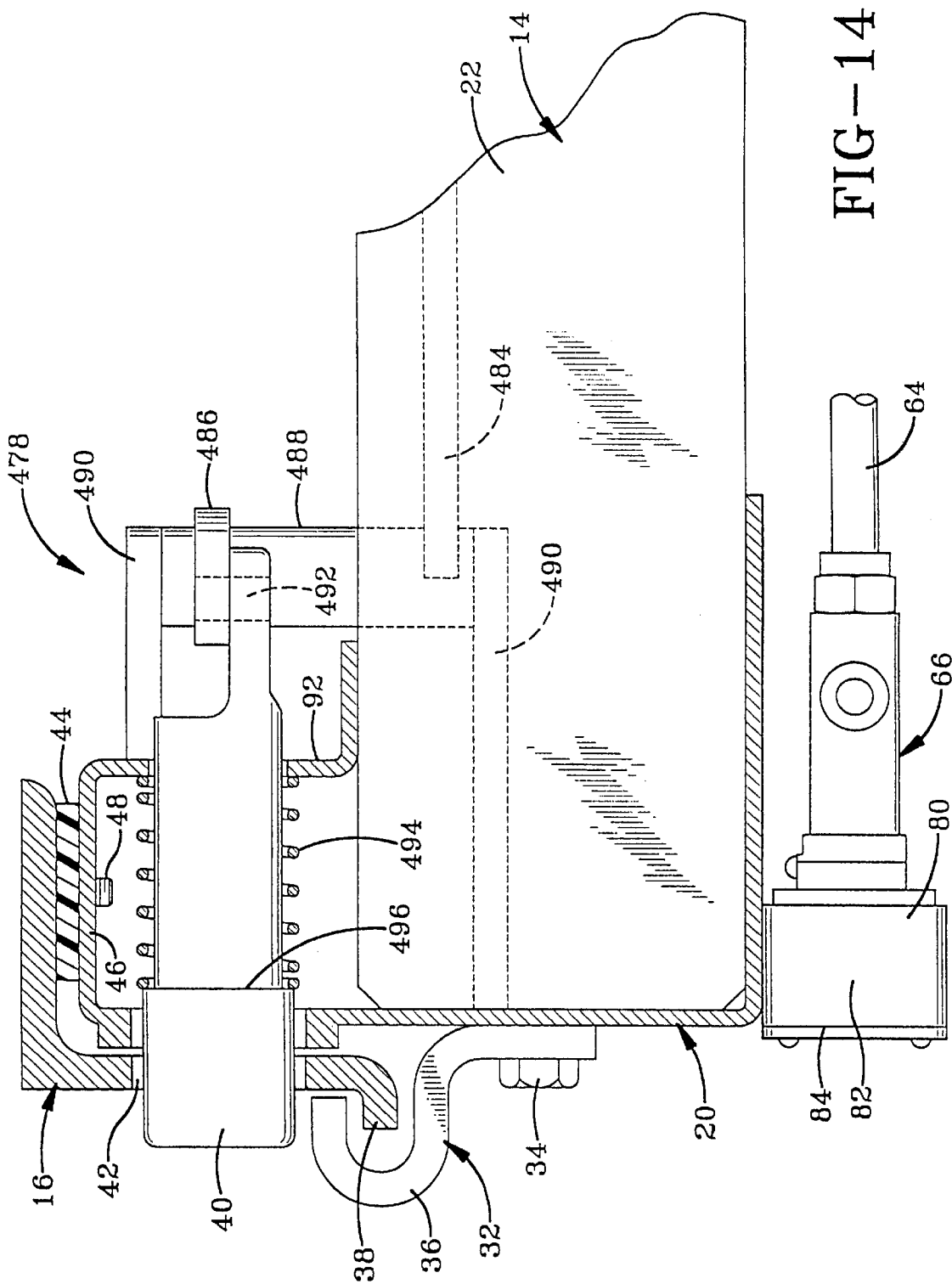

OPERATING SYSTEM FOR LOCKING PINS FOR SLIDING UNDERCARRIAGES

RELATED APPLICATIONS

This application is a continuation of Ser. No. 09/111,497, filed Jul. 8, 1998, now U.S. Pat. No. 6,213,489.

BACKGROUND OF THE INVENTION

1. Technical Field

This invention relates to a locking pin operating system for securing a sliding undercarriage to the suspension frame of a semitrailer. More particularly, the present invention relates to the driver assemblies that drive the locking pins from an engaged position to a disengaged position and then back again to the engaged position. Specifically, the present invention relates to a locking pin operating system that includes a single manually-operated valve that selectively directs pressurized air to expandable chambers wherein expansion of the chambers drives locking pins to disengaged positions while release of the pressurized air from the chambers allows springs to drive the locking pins to the engaged positions.

2. Background Information

In the United States, a tractor/semitrailer combination has been one of the most common modes of transportation of goods since World War II. The tractor/semitrailer combination includes a tractor having an engine, transmission, steerable front axle with wheels, and one or more rear drive axles and wheels. The tractor is attached to the semitrailer through a fifth wheel which is located over the tractor's rear drive axle. The semitrailer is unpowered and rides on one or more axles having a plurality of wheels. The semitrailer also includes a braking system and a suspension that are operated and adjusted from the tractor.

As the use of tractor/semitrailers grew over the years and their size increased, federal and state laws were passed that limit the weight per axle for tractors and semitrailers. It thus became desirable to be able to shift the load of the trailer to more evenly distribute its weight over the various axles. In order to redistribute the weight, a sliding undercarriage was developed that allows the relative position of the semitrailer's load to be adjusted with respect to the axles of the semitrailer. A sliding undercarriage typically includes a pair of slider rails having a linear array of locking pin holes disposed along their length. The slider rails slidably engage the frame of the suspension for the semitrailer and are held thereto by various devices. One device that holds the relative position of the slider rails with respect to the suspension frame is a locking pin. A sliding undercarriage typically includes two or four locking pins disposed about the corners of the suspension frame.

When the locking pins are engaged between the slider rails and the frame, the slider rails and load carrying portion of the semitrailer cannot be adjusted with respect to the wheels and suspension frame. The locking pins must be retracted to a disengaged position to allow the load carrying portion of the semitrailer to be adjusted along the suspension frame.

Both non-manual and manual systems are known in the art for moving the locking pins from an engaged position to a disengaged position and back to the engaged position. One manual system includes a handle connected to a torsion bar. A plurality of links connect each locking pin to the torsion bar. When adjustment of the semitrailer is required, the driver locks the brakes on both the tractor and semitrailer. The driver then climbs out of the tractor, walks to the sliding undercarriage, and pulls or lifts the manually operated locking pin release handle. This handle is typically positioned adjacent the wheels carried by the suspension frame. The pulling or lifting of the handle transmits a force through the links which overcomes the spring-loaded locking pins causing them to move to a disengaged position. The manual system typically includes means for holding all of the pins in the disengaged position while the driver returns to the tractor to reposition the sliding undercarriage. To reposition the undercarriage, the driver releases the brakes on the tractor while leaving the brakes on the semitrailer's sliding undercarriage engaged. The tractor is then driven forward or backward to slide the semitrailer relative to the sliding undercarriage. The driver then reapplies the tractor brakes and leaves the tractor to return to the sliding undercarriage to release the handle allowing the pins to return to the engaged position. Unfortunately, the spring-loaded locking pins are not usually perfectly aligned with the locking pin holes such that they all may not slide directly back into the engaged position. When this occurs, the driver returns to the tractor, releases the tractor brakes, and moves the semitrailer or rocks the semitrailer until the spring-loaded pins align with the locking pin holes and return to the engaged position. The driver must then reapply the brakes and walk around the semitrailer to visually verify that all pins are in the engaged position. The manually operated pin retraction systems, such as the one described above, often become impossible to operate due to damage or corrosion of the linkages and contamination with dirt or ice from exposure to the elements. The locking pins themselves can also become stuck in the locking pin holes when the semitrailer is parked on an incline or positioned with a twist in the frame. A common occurrence is that the driver will use a hammer to pound the locking pins from the engaged position to the disengaged position. Such hammering often damages the pins causing future operation of the manual system to be difficult.

In view of these problems with the manual system, non-manual systems using compressed air delivered from the braking system of the semitrailer were developed. One example of such a system can be found in U.S. Pat. No. 5,314,201. Still other improvements to that system may be found in U.S. Pat. Nos. 5,465,990, 5,564,727, and 5,620,195. These systems utilize compressed air delivered from the tractor to operate the braking and suspension systems of the semitrailer to move the locking pins between engaged and disengaged positions. These systems employ piston/cylinder combinations connected to the locking pins whereby selective delivery of pressurized air to the piston/cylinder causes the locking pin to move. Although these non-manual systems provide significant improvements over the manual system discussed above, improved driver assemblies and operating system configurations are still desired in the art.

For instance, the air cylinders used in the prior art to drive the locking pins between the engaged and disengaged positions are relatively exposed to the elements and unprotected from debris that may be thrown up from the road by the rear wheels of the tractor. It is thus desired in the art to provide a driver assembly that protects its moving parts from the elements to prevent or at least hinder the negative effects of water, salt, snow, and ice on the driver assembly. Another undesirable aspect of the driver assemblies of the prior art is their relative size. It is desirable to provide a driver assembly that is as compact as possible so that it may be fit onto various types of trailers without modification of the trailer.

One difficulty with providing a compact driver assembly is that the locking pins are relatively long compared to the portion of the locking pin that actually locks the semitrailer body to the sliding undercarriage frame. Furthermore, the air cylinders disclosed in the prior art are relatively long with their pistons extending therefrom to further increase their length. It is also desired in the art to provide a compact, weather resistant driver assembly for a locking pin system that provides an accommodating or flexible connection between the locking pin and the driver assembly to accommodate movement of the locking pin with respect to the frame.

SUMMARY OF THE INVENTION

In view of the foregoing, the primary objective of the present invention is to provide an operating system for slider locking pins.

Another objective of the present invention is to provide an operating system for slider locking pins that utilizes air pressure already available on the tractor-trailer.

Still another objective of the present invention is to provide an operating system for slider locking pins that provides a safety mechanism that protects the braking system of the trailer.

Yet another objective of the present invention is to provide an operating system for slider locking pins that may be installed onto existing trailer frames without substantial modification of the trailer frames.

Another objective of the present invention is to provide an operating system for slider locking pins that includes driver assemblies that are substantially compact.

A further objective of the present invention is to provide an operating system for slider locking pins that is designed to withstand adverse weather conditions such as water, ice, mud, and the like.

Yet a further objective of the present invention is to provide an operating system for slider locking pins that is strong enough to withstand various shock forces that may occur on the road such as impacts from debris and the like.

Still a further objective of the present invention is to provide an operating system for slider locking pins utilizing an expandable air bladder that is substantially impervious to weather and provides reliable operation through repeated use.

Another objective of the present invention is to provide an operating system for slider locking pins utilizing minimal moving parts.

A further objective of the present invention is to provide an operating system for slider locking pins utilizing a return spring that is protected from the elements.

Another objective of the present invention is to provide an operating system for slider locking pins that provides continuous pressure to the locking pins holding them in position while in use.

Another objective of the present invention is to provide an operating system for slider locking pins utilizing a piston cylinder assembly that encloses the return spring.

Another objective of the present invention is to provide an operating system for slider locking pins utilizing the locking pin as a moveable cylinder in cooperation with a fixed piston.

A further objective of the present invention is to provide an operating system for slider locking pins utilizing a service chamber and linkage mechanism that moves a locking pin between the engaged and disengaged positions.

Another objective of the present invention is to provide an operating system for slider locking pins that is of simple construction, which achieves the stated objectives in a simple, effective, and inexpensive manner, and which solves the problems and which satisfies the needs existing in the art.

These and other objectives and advantages are obtained by the operating system of the present invention, the general nature of which may be stated as including a source of air pressure; a main supply line in fluid communication with the source of air pressure; a first valve in fluid communication with the main supply line, the first valve movable between open and closed positions; at least two locking pins; a return spring associated with each of the locking pins, each of the return springs continuously forcing one of the locking pins into an engaged position; a locking pin driver assembly connected to each of the locking pins; and each of the locking pin driver assemblies including an expandable bladder in fluid communication with the valve, each of the expandable bladders overcoming one of the return springs when the first valve is in the open position moving one of the locking pins to a disengaged position.

Other objectives and advantages are obtained by the operating system of the present invention, the general nature of which may be stated as including a source of air pressure; a main supply line in fluid communication with the source of air pressure; a first valve in fluid communication with the main supply line, the first valve movable between open and closed positions; at least two locking pins; a return spring associated with each of the locking pins, each of the return springs continuously forcing one of the locking pins into an engaged position; a locking pin driver assembly connected to each of the locking pins; each of the driver pin assemblies comprising: a hollow fixed bracket; a cylinder carried by the bracket; a piston engaging the cylinder, the piston connected to the locking pin; and the return spring being disposed within the cylinder, the return spring engaging the piston; the piston disposed within the cylinder and the hollow fixed bracket.

Still other objectives and advantages are obtained by the operating system of the present invention, the general nature of which may be stated as including a source of air pressure; a main supply line in fluid communication with the source of air pressure; a first valve in fluid communication with the main supply line, the first valve movable between open and closed positions; at least two locking pins; a return spring associated with each of the locking pins, each of the return springs continuously forcing one of the locking pins into an engaged position; a locking pin driver assembly connected to each of the locking pins, each of the locking pin driver assemblies comprising: a piston having a shaft; the shaft of the piston adapted to be connected to the suspension frame; the locking pin defining a cylinder; the piston being disposed in the cylinder; and a base attached to the locking pin to form a chamber between the base, cylinder, and the piston; the chamber in fluid communication with the first valve; the shaft of the piston extending through the base of the cylinder.

Yet other objectives and advantages are obtained by the operating system of the present invention, the general nature of which may be stated as including a source of air pressure; a main supply line in fluid communication with the source of air pressure; a first valve in fluid communication with the main supply line, the first valve movable between open and closed positions; at least two looking pins; a return spring associated with each of the locking pins, each of the return springs continuously forcing one of the locking pins into an engaged position; a locking pin driver assembly connected to each of the locking pins, each of the driver assemblies comprising: a service chamber in fluid communication with the first valve; the service chamber having an output shaft; and lever means connecting the output shaft to the locking pin for moving the locking pin to the disengaged position when the shaft is extended from the service chamber.

BRIEF DESCRIPTION OF THE DRAWINGS

The preferred embodiments of the invention, illustrative of the best modes in which the Applicant contemplated applying the principles of the invention, are set forth in the following description and are shown in the drawings and are particularly and distinctly pointed out and set forth in the appended claims.

FIG. 14 is an elevational view of the third alternative embodiment of the present invention.

Similar numbers refer to similar elements throughout the drawings.

DESCRIPTION OF THE PREFERRED EMBODIMENTS

Figure 1:
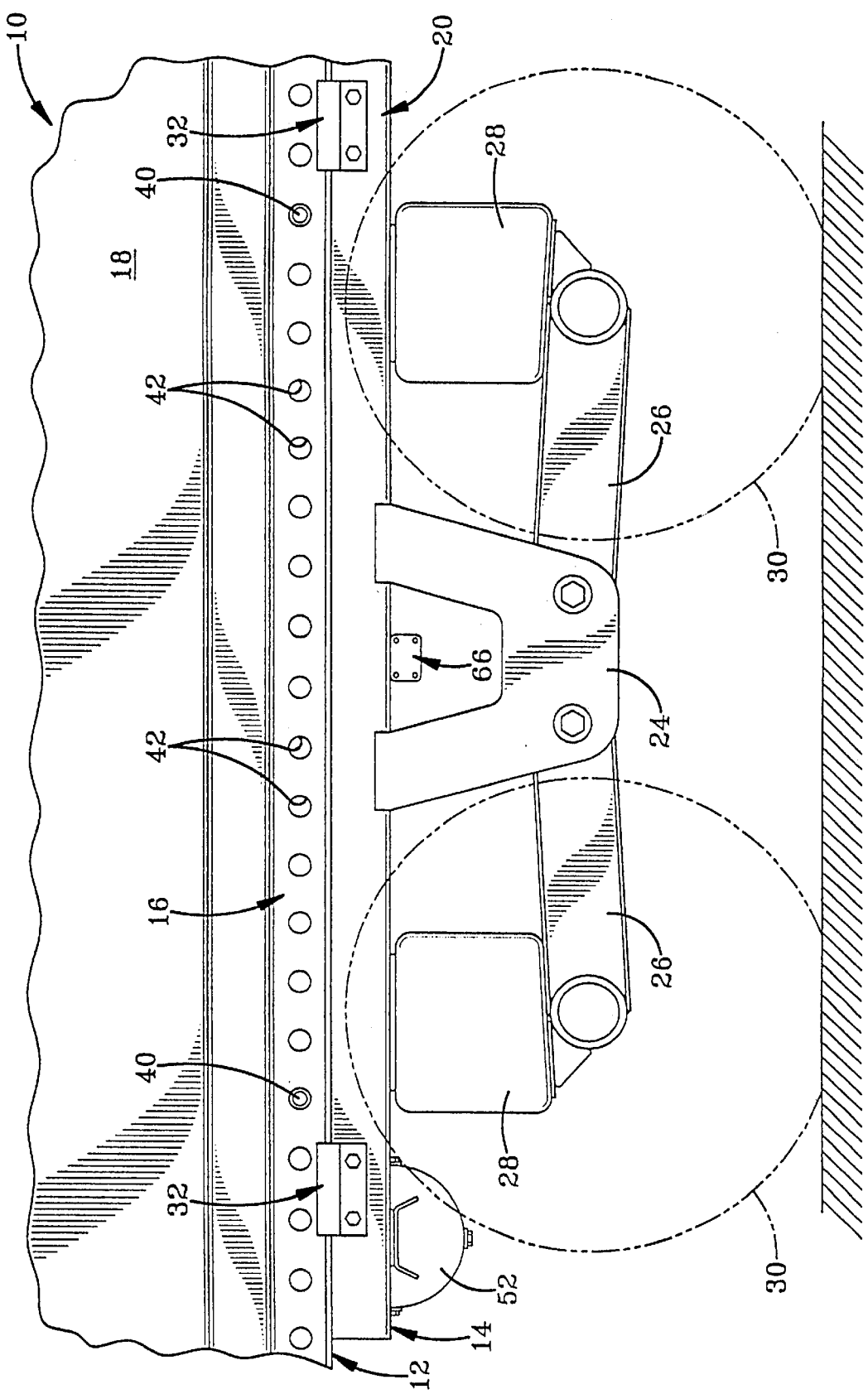
FIG. 1 is a side elevational view of the rear portion of a sliding undercarriage attached to a trailer frame.
Figure 2:
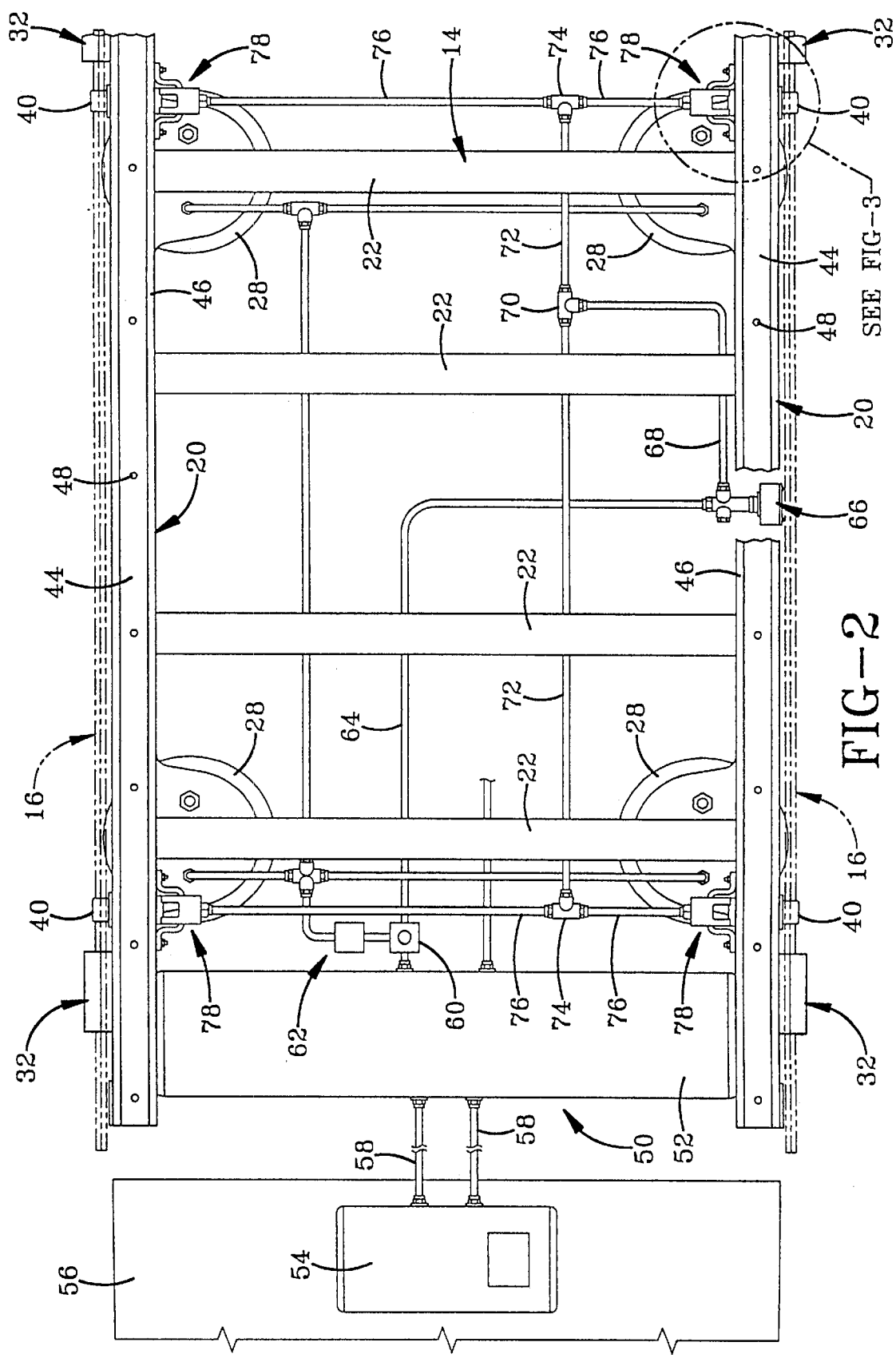
FIG. 2 is a top plan view of the trailer frame incorporating the operating system of the present invention with the semitrailer removed, the slider rails depicted in dashed lines.

The operating system of the present invention is used in conjunction with the semitrailer 10 depicted in the drawings. As may be seen in FIG. 1, semitrailer 10 includes a sliding undercarriage, indicated generally by the numeral 12, that is adjustably mounted on a trailer frame, indicated generally by the numeral 14. Sliding undercarriage 12 includes a pair of substantially parallel, spaced slider rails or body rails 16. Each rail 16 is attached by appropriate means to the body 18 of semitrailer 10 such that adjustment of the position rails 16 adjusts the position of body 18. Frame 14 includes at least a pair of side rails 20 connected by a plurality of cross bars 22. As may be seen in FIG. 1, frame 14 may also include a frame bracket 24 that extends downwardly from side rail 20. Beams 26 pivotally extend forwardly and rearwardly from frame bracket 24 to at least partially support a suspension air spring 28. The locations of the wheels of semitrailer 10 are depicted in FIG. 1 by the dashed lines labeled with the numeral 30.

Frame 14 also includes at least two safety clips or hold down clamps 32 attached to each rail 20 that slidably engage slider rail 16. Each safety clip 32 may be attached to frame 14 by any appropriate means such as a weld or a nut and bolt combination 34. As may be seen for example in FIG. 4, safety clip 32 includes a hook portion 36, that substantially surrounds and slidably engages a flange 38 of slider rail 16. It may thus be understood that semitrailer 10 is retained on frame 14 laterally through the engagement between safety clips 32 and flange 38. Semitrailer 10 is retained longitudinally with respect to frame 14 by at least a plurality of locking pins 40 that are selectively disposed in locking pin holes 42 disposed in slider rails 16. Holes 42 are disbursed along the entire length of the slider rail 16 and are typically spaced at equal intervals. Engagement between locking pins 40 and slider rail 16 also vertically retains semitrailer 10 with respect to frame 14.

As discussed in the Background of the Invention section of this specification, it is desirable for semitrailer 10 to be adjustable with respect to frame 14. As such, body 18 of semitrailer 10 is supported by slider rails 16 which, in turn, are slidably disposed on frame 14 when locking pins 40 are disengaged. Slider rails 16 slidably engage bearings or sections of glide material 44 attached to the upper surface 46 of side rails 20 of frame 14. Bearings 44 may be attached to upper surface 46 of rails 20 by any of the numerous appropriate means known in the art but may be preferably attached by a plurality of screws 48 as depicted in the drawings.

In accordance with one of the main objectives of the present invention, an improved operating system for slider locking pins 40 is provided and is indicated generally by the numeral 50 in the accompanying drawings. Operating system 50 allows each of locking pins 40 to be retracted to a disengaged position by manipulating a single valve. Operating system 50 employs a minimum of elements and moving parts to ensure its reliability. Operating system 50 obtains pressurized air from the air tank 52 that is carried by frame 14 to provide pressurized air to the braking system of the tractor trailer. Air tank 52 obtains a supply of compressed air from the compressor 54 disposed on the tractor 56. A plurality of detachable pigtail supply lines 58 selectively attach air tank 52 to compressor 54. Operating system 50 includes a brake protection valve 60 connected to air tank 52. Brake protection valve 60 is configured to sense air pressure in air tank 52 and close when the air pressure in air tank 52 drops below a predetermined level that is the minimum for operating the braking system. The suspension operating system 62 branches out of one side of brake protection valve 60 while locking pin operating system 50 branches from the other side of brake protection valve 60.

A main supply line 64 provides fluid communication between brake protection valve 60 and a flipper valve 66 that is disposed between wheels 30 and carried by one of side rails 20 of frame 14. Main supply line 64 may be fabricated from any of a variety of known materials but it is preferred that supply line 64 is fabricated from a relatively flexible material. It is preferred that flipper valve 66 be disposed beneath rail 20 as depicted in the drawings as it is a sheltered location. The exact location of flipper valve 66 is not, however, critical to the present invention. Main supply line 64 provides a constant source of pressurized air to flipper valve 66 when brake protection valve 60 senses adequate air pressure in air tank 52. Flipper valve 66 is used to selectively direct pressurized air from main supply line 64 to each of locking pins 40 causing them to move to the disengaged position. It is to be understood that operation of flipper valve 66 directs the pressurized air to all of locking pins 40 simultaneously.

Flipper valve 66 includes an outlet line 68 that provides fluid communication between a T-joint 70 and flipper valve 66. A pair of secondary supply lines 72 provide fluid communication between T-joint 70 and a second pair of T-joints 74. A pair of primary supply lines 76 provide fluid communication between T-joint 74 and locking pin driver assemblies 78 that cause locking pins 40 to engage and disengage slider rails 16.

It is generally desirable to fabricate line 68 and lines 72 from a generally flexible material. Furthermore, primary supply lines 76 are fabricated from a generally flexible material for a reason more clearly described below with reference to FIGS. 6 and 7. Each of lines 64, 68, 72, and 76 may be supported from frame 14 in a manner to provide protection from the elements and debris that may be thrown up from the road by the wheels of the tractor 56 or semitrailer 10. Similarly, flipper valve 66 is also disposed in a sheltered location. Flipper valve 66 is also provided with a cover 80 that substantially surrounds valve handle 82 in a manner that prevents exposure to the elements and accidental operation of flipper valve 66. To provide additional protection, a face plate 84 may be provided that must be detached from cover 80 prior to operating valve 66.

Figure 3:
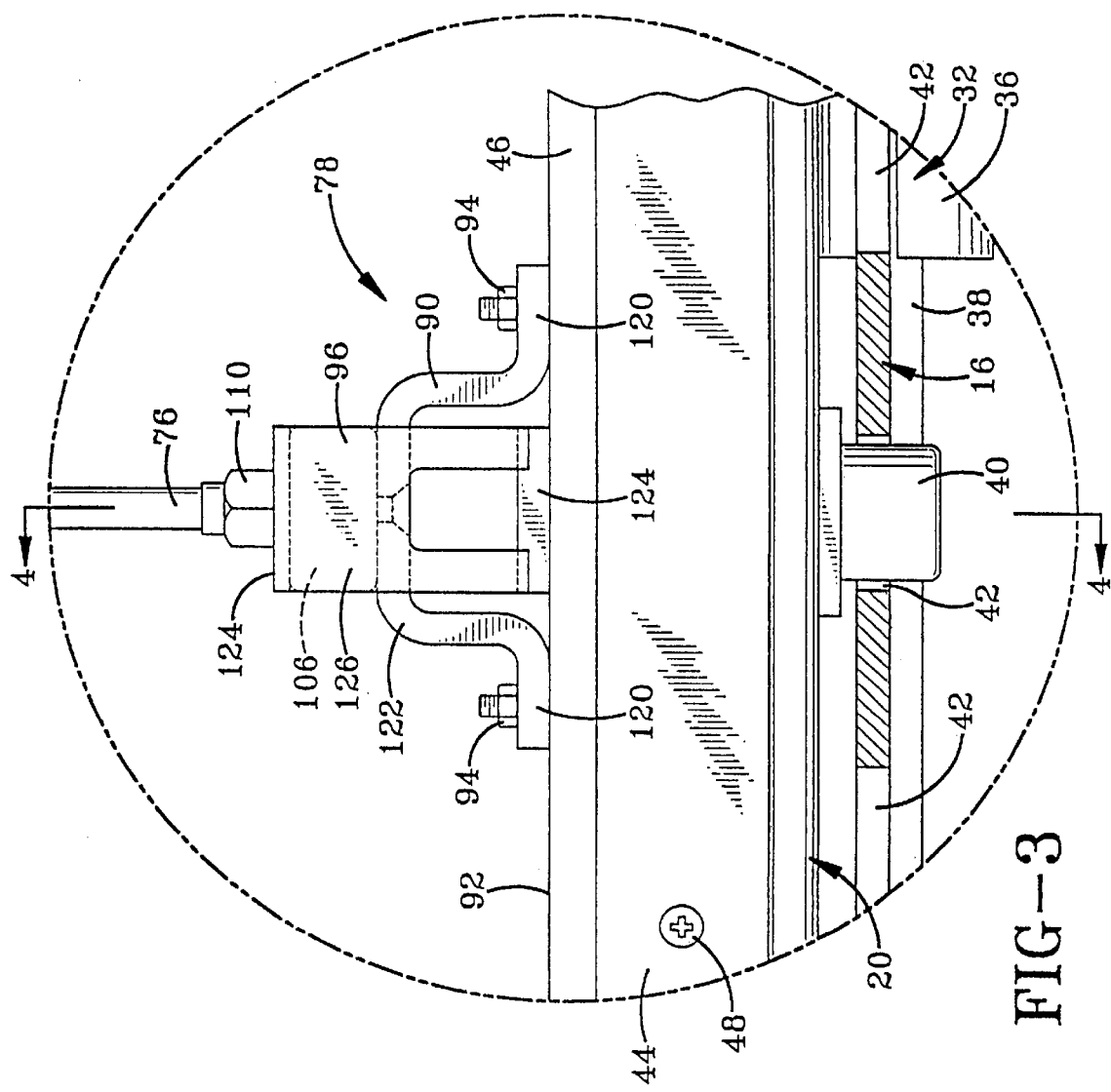
FIG. 3 is a detailed view of the area appearing in the dashed circle depicted in FIG. 2.
Figure 4:
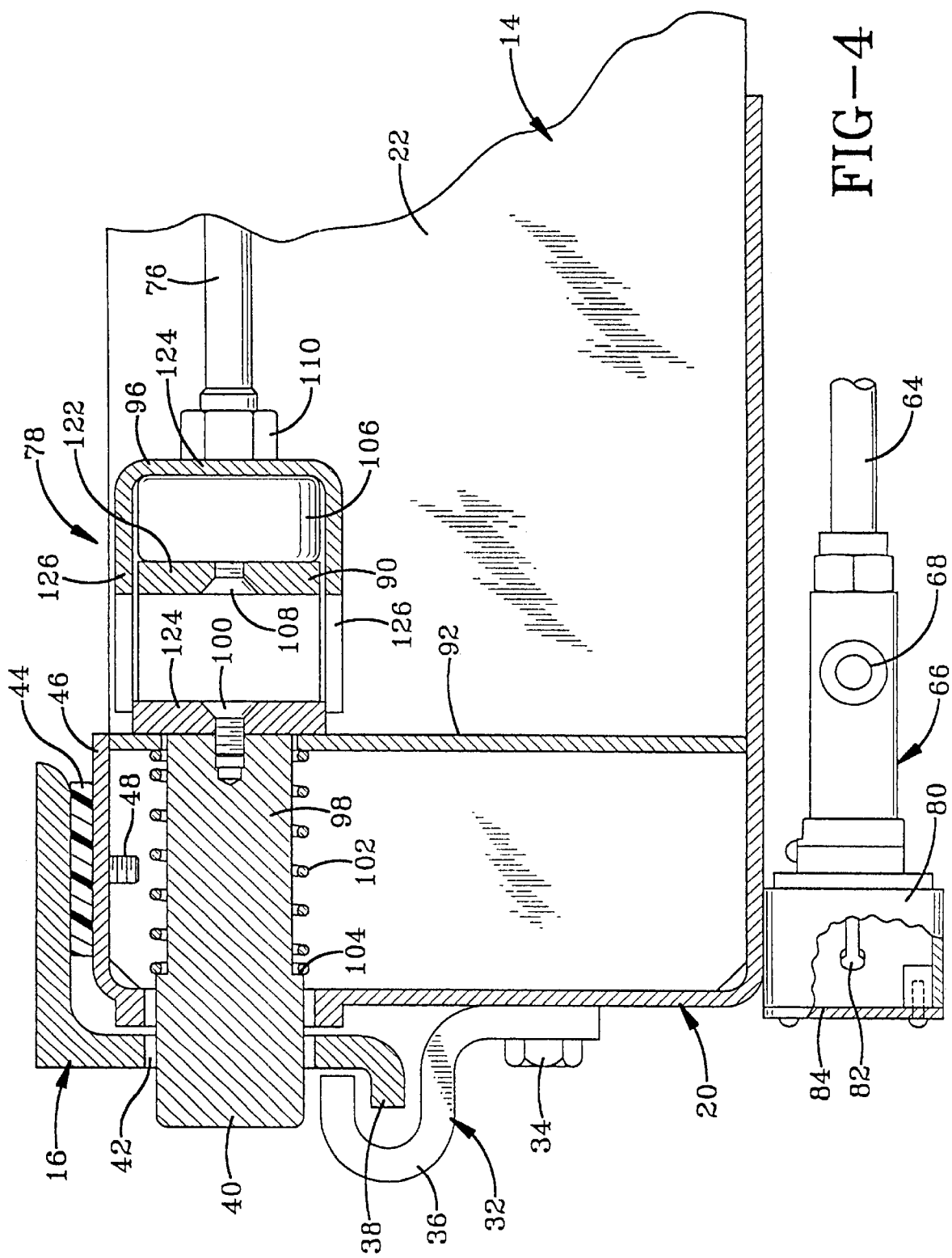
FIG. 4 is a sectional view taken substantially along line 4—4 of FIG. 3 showing the pin in the engaged position.
Figure 5:
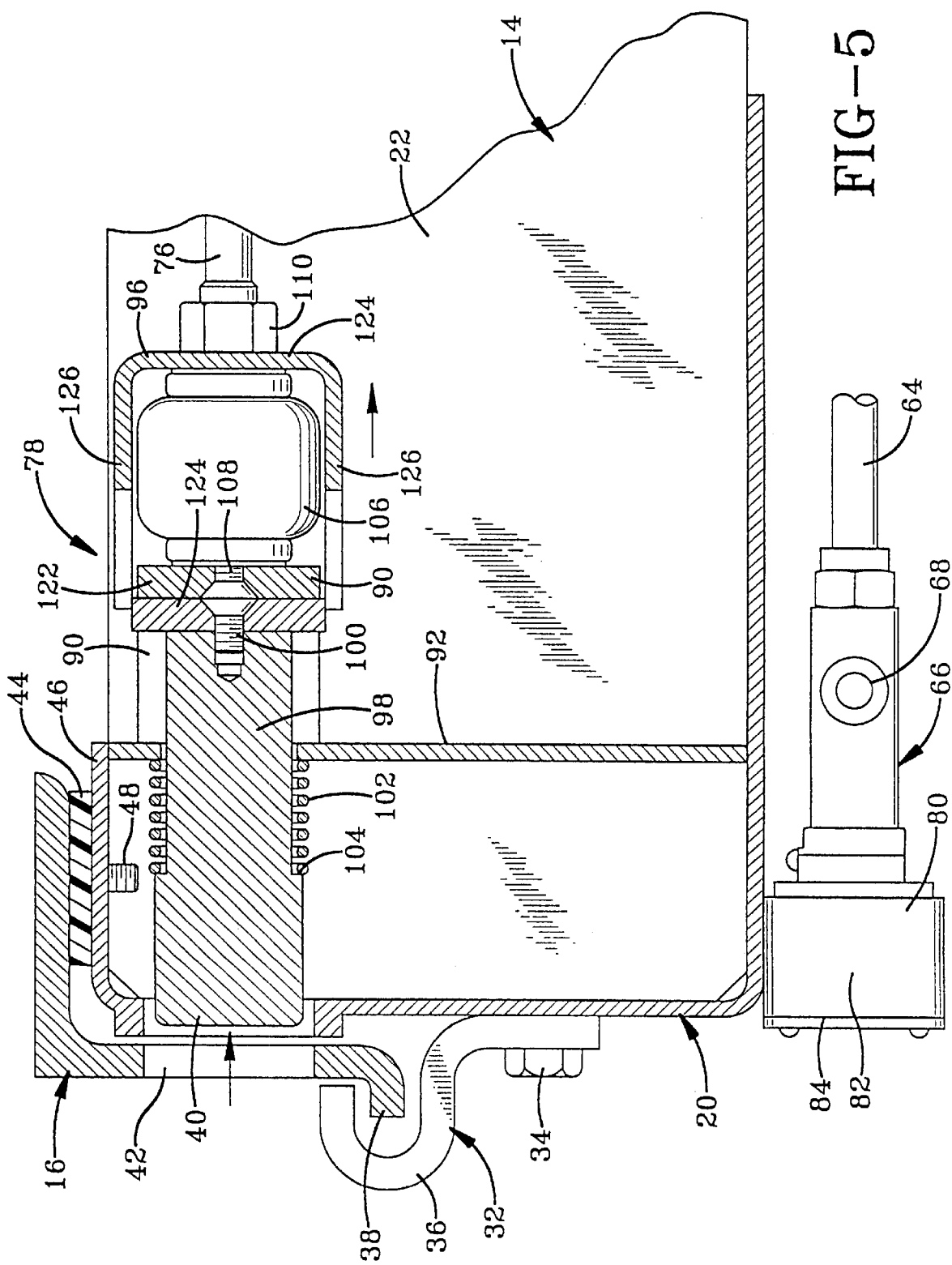
FIG. 5 is a sectional view substantially similar to FIG. 4 depicting the pin in a disengaged position.

Another objective of the present invention is to provide operating system 50 with reliable locking pin driver assemblies 78 that utilize an expandable air bladder to move locking pins 40. A view of one embodiment of locking pin driver assembly 78 meeting this objective is depicted in FIGS. 3–5. Assembly 78 includes a fixed bracket 90 attached to an inner wall 92 of rail 20. Bracket 90 may be attached by any of a variety of attachment means known in the art such as the bolts 94 depicted in the figures or by appropriate welds. A traveling bracket 96 is attached to the shaft 98 of locking pin 40 by appropriate means such as the bolt or screw 100 depicted in the drawings. A return spring 102 is disposed about shaft 98 to create an outwardly directed force on locking pin 40. Spring 102 is seated against inner wall 92 and a shoulder 104 of locking pin 40 such that locking pin 40 is constantly urged outwardly into a locking pin hole 42 to the engaged position. When locking pin 40 is disposed in a locking pin hole 42 as shown in FIGS. 3 and 4, it is said to be in the engaged position. Spring 102 urges locking pin 40 outwardly until traveling bracket 96 engages inner wall 92 to counteract the force of spring 102. As can be perhaps best seen in FIGS. 4 and 5, rail 20 is substantially hollow thus forming a protective covering around most of locking pin 40 and return spring 102.

The driving member of assembly 78 that moves locking pin 40 from the engaged position to the disengaged position depicted in FIG. 5 is an expandable air bladder in the form of an air spring 106. Air spring 106 is disposed between fixed bracket 90 and traveling bracket 96. As depicted in the drawings, air spring 106 may be connected to fixed bracket 90 by appropriate means such as a screw or bolt 108. As is also depicted in the drawings, air spring 106 includes a fixture that extends through traveling bracket 96 to fluidly connect with primary supply line 76. A reliable connection may be formed by a lock nut 110.

With specific reference to FIGS. 3 and 4, fixed bracket 90 includes a pair of spaced apart feet 120 that are connected by a U-shaped portion 122. Traveling bracket 96 includes two opposed ends 124 connected by a pair of opposed sides 126. Shaft 98 of locking pin 40 is attached to one of ends 124 while the other of ends 124 is attached to one end of air spring 106. The other end of air spring 106 is attached to U-shaped portion 122 of fixed bracket 90. Fixed bracket 90 and traveling bracket 96 are also disposed such that U-shaped portion 122 is disposed between sides 126. There is, however, accommodating space between U-shaped portion 122 and traveling bracket 96.

Traveling bracket 96 is only slidably and loosely supported on fixed bracket 90 such that it moves with locking pin 40 and may accommodate skewed movement by locking pin 40. The use of air spring 106 allows a fluid-tight connection to be maintained while accommodating skewed relative movement between locking pin 40 and fixed bracket 90. When pressurized air is supplied to air spring 106, air spring 106 creates an expansive force between traveling bracket 96 is urged away from rail 20 such that locking pin 40 is pulled inwardly toward the disengaged position. Air spring 106 is sized sufficiently and the air pressure is sufficient to provide enough force to overcome spring 102 and any friction occurring between pin 40 and slider rail 16. Traveling bracket 96, fixed bracket 90, and air spring 106 are sized such that traveling bracket 96 engages fixed bracket 90 when locking pin 40 has reached the disengaged position depicted in FIG. 5 to counteract the expansion of air spring 106. In an alternative embodiment, air spring 106 is adapted to cease expansion when locking pin 40 is in the disengaged position.

Figure 6:
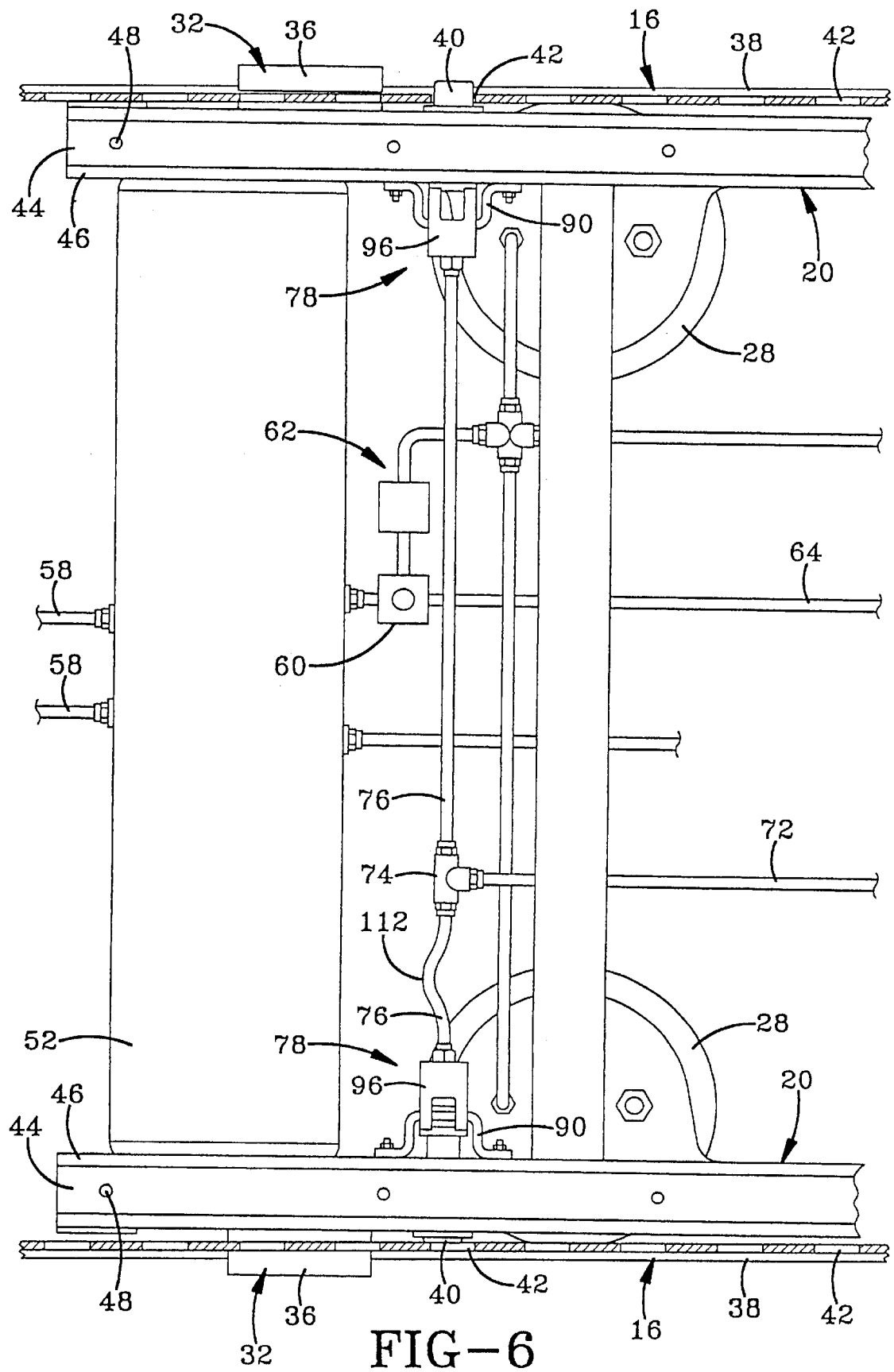
FIG. 6 is a top plan view of a portion of the trailer frame showing one locking pin engaged with another locking pin disengaged.
Figure 7:
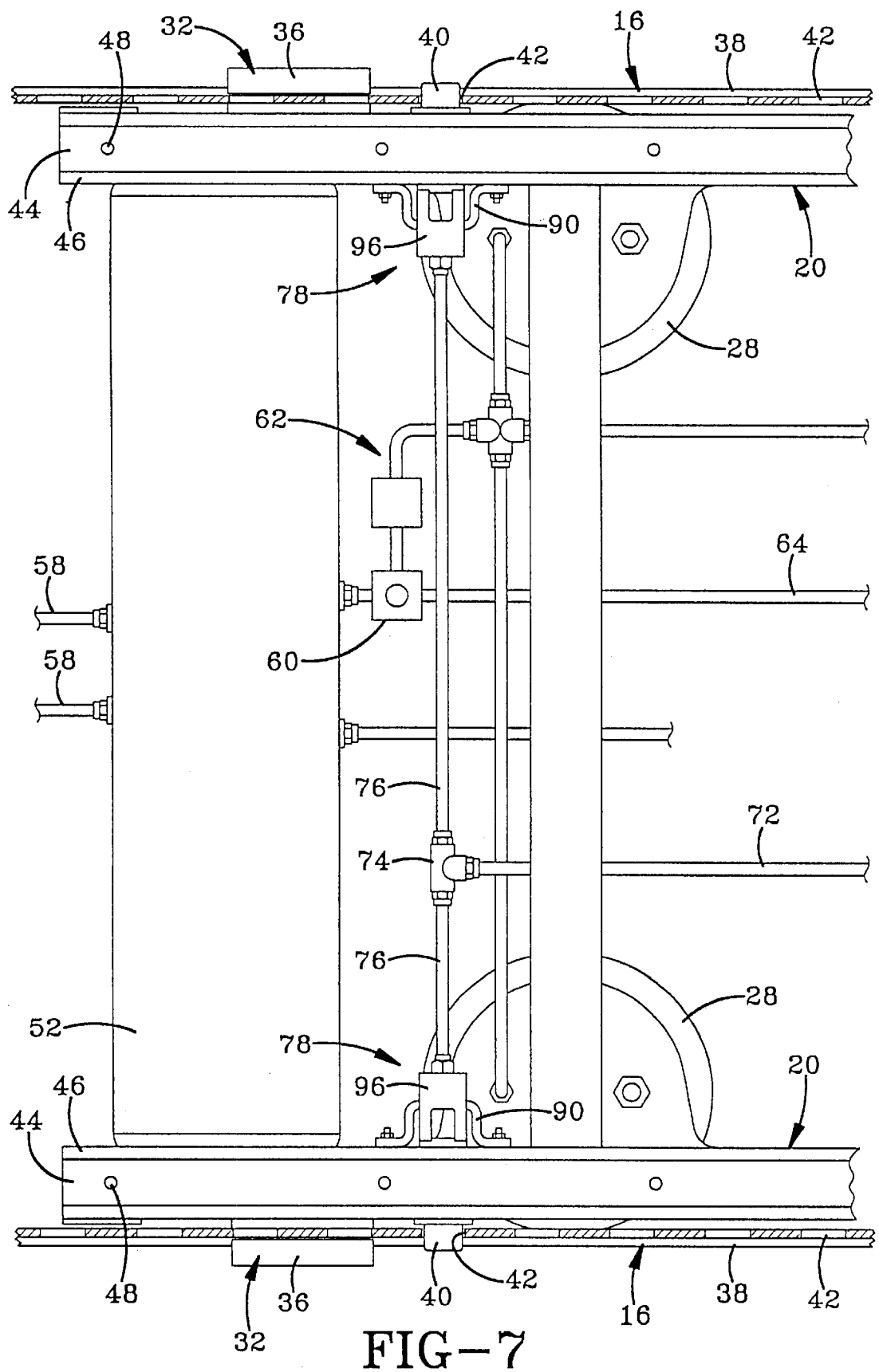
FIG. 7 is a view substantially similar to FIG. 6 showing both locking pins engaged.

Locking pin 40 remains in the disengaged position until the supply of pressurized air delivered by air tank 52 through flipper valve 66 is cut off. When the supply of pressurized air is cut off, return spring 102 expands and drives locking pin 40 back toward the engaged position depicted in FIG. 4. A frequent occurrence with semitrailers employing slider rails 16 is that slider rails 16 are not perfectly aligned with rails 20 when return spring 102 forces locking pin 40 back toward the engaged position. This occurrence is depicted in FIG. 6 where it is shown that locking pin 40 on one side has returned to the engaged position while locking pin 40 at the other side has lodged against the inner surface of slider rail 16. FIG. 6 also depicts the necessity of fabricating primary supply line 76 from a relatively flexible material. When traveling bracket 96 moves away from rail 20, primary supply line 76 must flex as indicated at numeral 112 to accommodate the movement of traveling bracket 96. When locking pin 40 is jammed, as depicted in FIG. 6, the user of operating system 50 returns to tractor 56 and creates a rocking motion between semitrailer 10 and frame 14. This rocking motion is typically sufficient to realign locking pin 40 with locking pin hole 42 allowing return spring 102 to force locking pin 40 back to the engaged position as shown in FIG. 7.

In view of the foregoing, it may be understood that locking pin driver assembly 78 provides a reliable mechanism for driving locking pin 40 between the engaged and disengaged positions. Driver assembly 78 is substantially protected from the elements and potential damage from debris thrown up from the road, The use of air spring 106 provides a compact mechanism that generates forces large enough to overcome friction between pin 40 and slider 16 and other jamming forces such as ice or rust.

Operating system 50 does not require air pressure to maintain pins 40 in the engaged position. Thus, pins 40 return to the engaged position upon a failure of air tank 52 or compressor 54.

Figure 8:
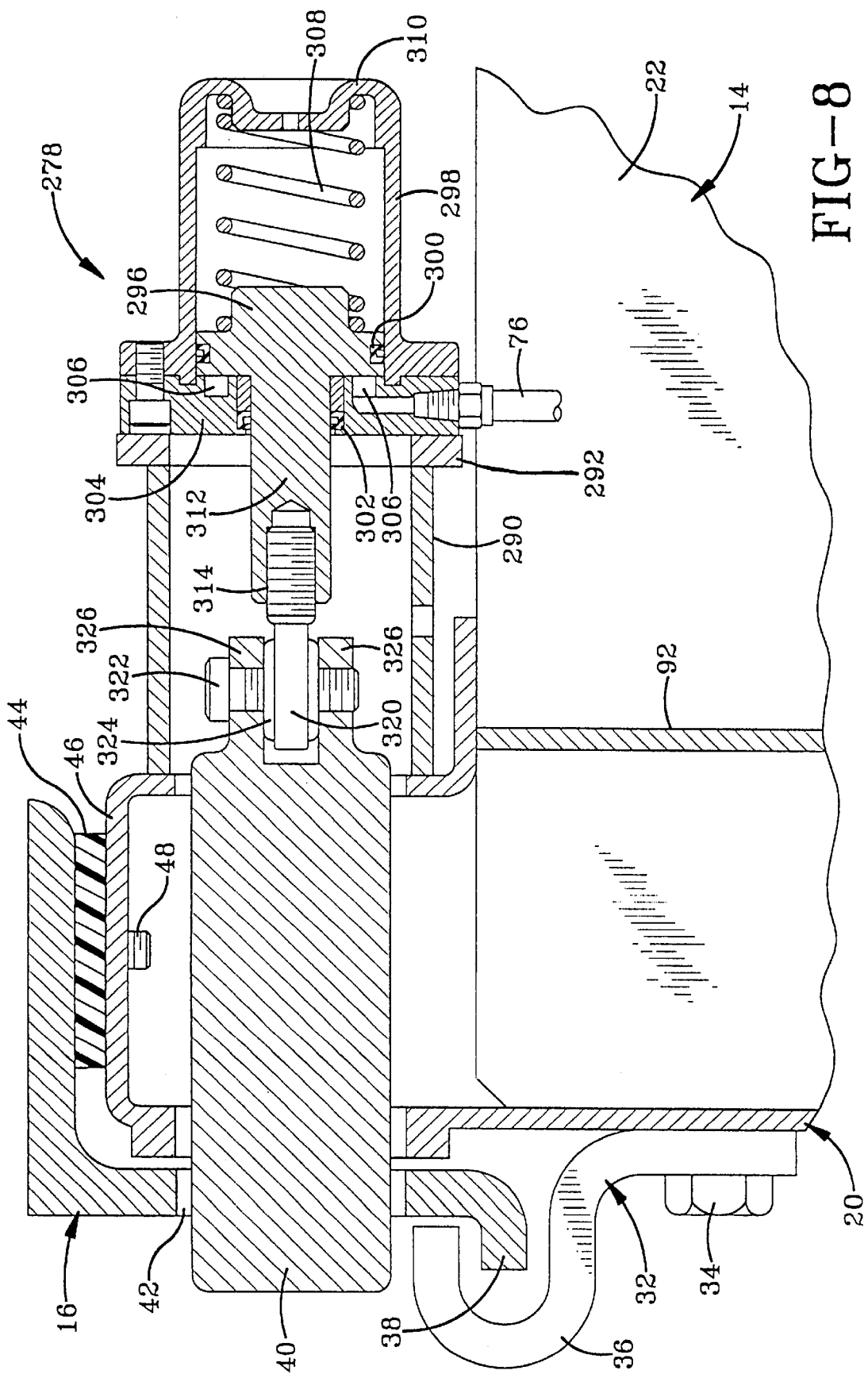
FIG. 8 is a sectional view substantially similar to FIG. 4 depicting a first alternative embodiment of the present invention with the locking pin in the engaged position.
Figure 9:
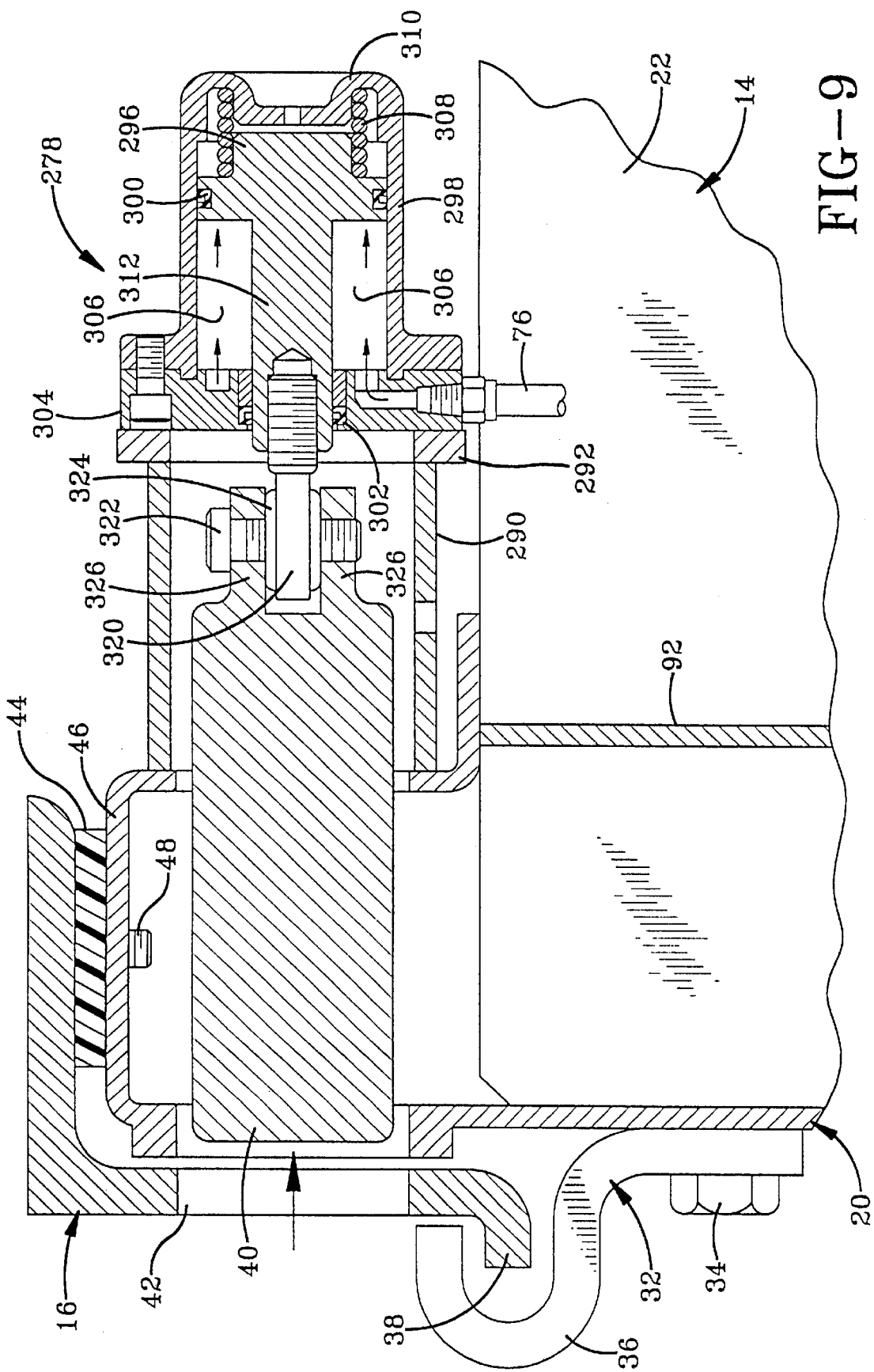
FIG. 9 is a sectional view substantially similar to FIG. 8 showing the first alternative embodiment in the disengaged position.

A second alternative embodiment of the locking pin driver assembly of the present invention is depicted in FIGS. 8 and 9 and is indicated generally by the numeral 278. Driver assembly 278 includes a fixed bracket 290 that extends inwardly from inner wall 92 of frame rail 20. Fixed bracket 290 is hollow and includes an annular flange 292. Fixed bracket 290 may be attached to rail 20 by any of a variety of suitable means known in the art. In the second embodiment of the present invention, the traveling member is in the form of a piston 296 that is slidably received in a cylinder 298 that is substantially rigidly attached to a base 304 which is, in turn, carried by flange 292 of fixed bracket 290. A seal 300 is seated in a groove in piston 296 to provide a fluid tight connection between piston 296 and cylinder 298. A second seal 302 is provided in base 304 of cylinder 298 to form a sealed chamber 306 between piston 296 and base 304. Chamber 306 is in fluid communication with primary supply line 76 such that chamber 306 may be filled with pressurized air when flipper valve 66 is opened. A return spring 308 is disposed in cylinder 298 between a grooved cylinder end cap 310 and piston 296. Thus, it may be understood that piston 296 is disposed between chamber 306 and spring 308.

Piston 296 includes a shaft 312 that may include a threaded bore 314. Piston 296 may be attached to locking pin 40 by any of a variety of appropriate means. In the embodiment of the invention depicted in FIGS. 8 and 9, piston 296 is attached to locking pin 40 by the connection of a first pin 320 to a second pin 322. First pin 320 is threaded into threaded bore 314 of piston 296 and carries a spherical bushing 324 at the end projected from piston 296. Second pin 322 passes through and threadably engages at least one of a pair of arms 326 projecting inwardly from locking pin 40. Second pin 322 is further disposed through spherical bushing 324 such that piston 296 is attached to locking pin 40 in an adjustable and accommodating manner. Bushing 324 allows locking pin 40 to move with respect to piston 296 without creating undesirable torsion forces in piston 296. Both pins 320 and 322 as well as bushing 324 are disposed within fixed bracket 290 and are thus provided protection. In addition to the protection provided by hollow fixed bracket 290, cylinder 298 substantially protects spring 308 and piston 296 from the elements.

The second embodiment of the pin driver assembly 278 is operated by supplying pressurized air to chamber 306 causing piston 296 to move into cylinder 298. As piston 296 moves inwardly, locking pin 40 is moved toward the disengaged position. When piston 296 is fully inserted into cylinder 298, locking pin 40 has reached the disengaged position depicted in FIG. 9. At this time, spring 308 has also been fully compressed. When the pressure is released from primary supply line 76, return spring 308 expands forcing piston 296 and pin 40 back toward the engaged position depicted in FIG. 8. It may thus be understood that driver assembly 278 provides reliable operation while protecting its elements from the weather and outside forces.

Figure 10:
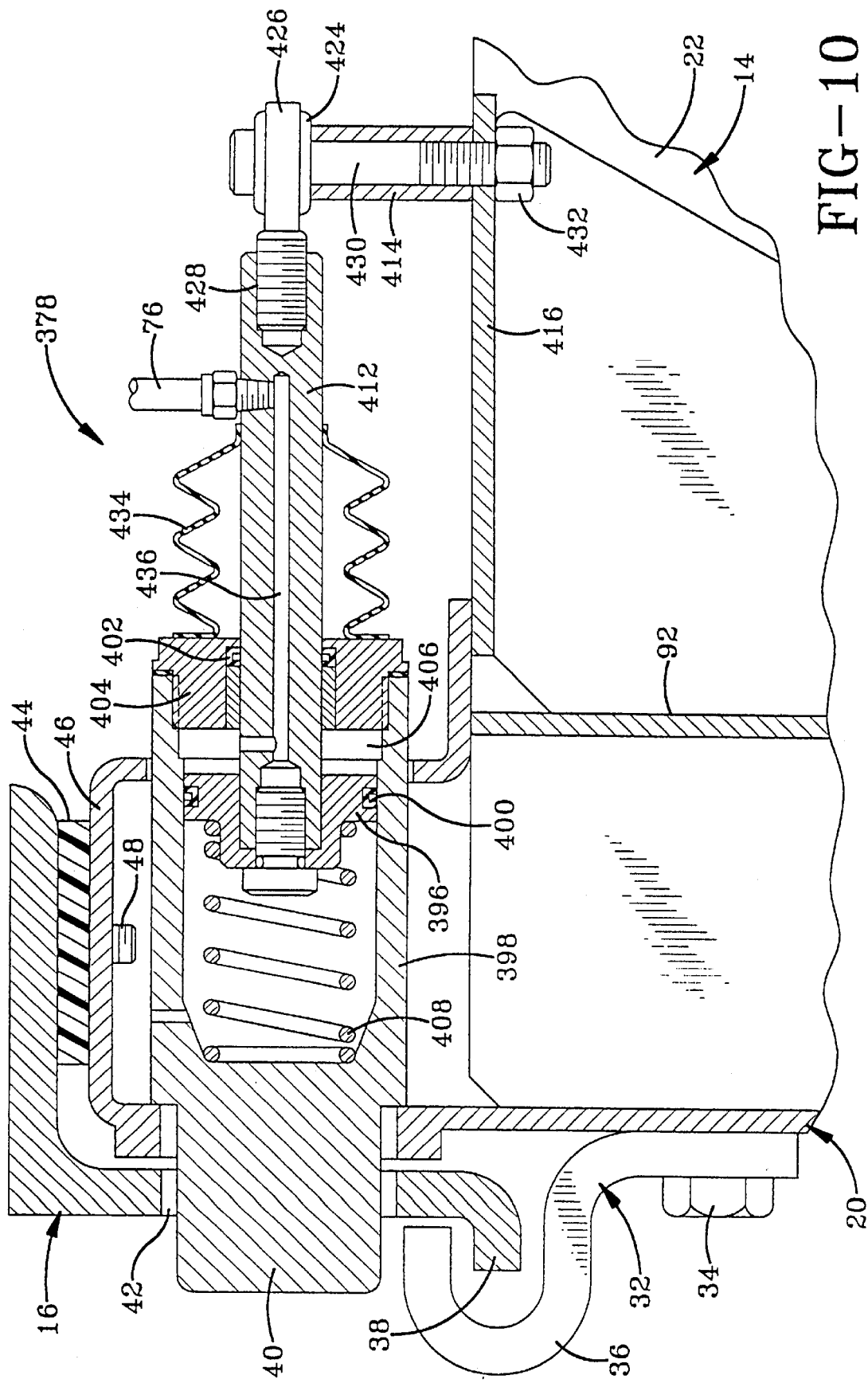
FIG. 10 is a sectional view substantially similar to FIG. 4 depicting a second alternative embodiment of the present invention with the locking pin in the engaged position.
Figure 11:
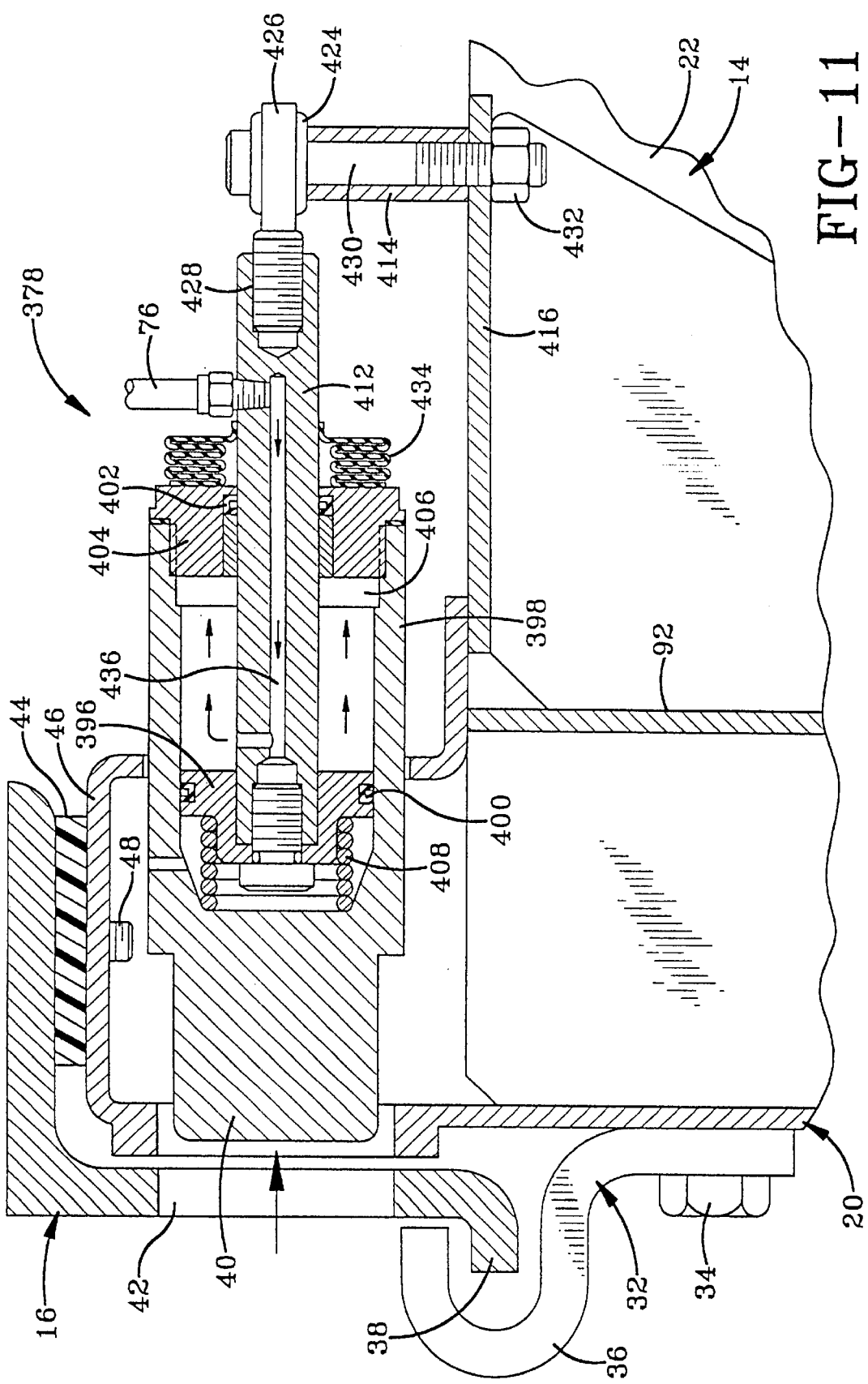
FIG. 11 is a sectional view substantially similar to FIG. 10 depicting the locking pin in the disengaged position.

A third embodiment of the driver assembly of the present invention is depicted in FIGS. 10 and 11 and is indicated generally by the numeral 378. Driver assembly 378 includes a piston 396 slidably disposed in a cylinder 398. Piston 396 includes a shaft 412 that is connected to primary supply line 76. Shaft 412 is supported at its projected end by a support sleeve 414 that is attached to a frame member 416 that may be carried by rail 20 of frame 14. As in the previously described embodiment, a spherical bushing 424 is employed between support sleeve 414 and shaft 412 to accommodate movement of locking pin 40 with respect to frame 14. Shaft 412 is attached to support sleeve 414 by a threaded pin 426 that is received in a threaded bore 428. Pin 426 carries spherical bushing 424. Pin 426 may be attached to support sleeve 414 by a bolt 430 that extends entirely through sleeve 414 and threadably engages a nut 432. Bolt 430 may also be used to attach sleeve 414 to frame 14.

Shaft 412 is protected from the elements by a protection sleeve 434 that is collapsible and expandable. Sleeve 434 extends between primary supply line 76 and base 404 of cylinder 398. A first seal 400 is provided between piston 396 and cylinder 398 and a second seal 402 is provided between shaft 412 and base 404 to create a fluid tight chamber 406 between base 404 and piston 396. It may be understood that sleeve 434 protects outside surface of shaft 412 and thus helps to maintain good contact between shaft 412 and second seal 402.

In the third embodiment of the present invention, cylinder 398 is integrally formed in pin 40 such that cylinder 398 and base 404 move between the engaged position and disengaged position when the air pressure supplied by primary supply line 76 is activated and deactivated. A return spring 408 is disposed within cylinder 398 and is disposed to urge piston 396 away from locking pin 40. As such, piston 396 and shaft 412 remain substantially fixed during the operation of driver assembly 378.

Shaft 412 includes an air supply passageway 436 that provides fluid communication between chamber 406 and primary supply line 76. When pin 40 is in the engaged position, spring 408 is in the expanded position and chamber 406 is at its minimum volume. When flipper valve 66 is opened, pressurized air is supplied to chamber 406 causing base 404 to move inwardly along shaft 412. As such, cylinder 398 and thus pin 40 are moved inwardly towards the disengaged position causing spring 408 to collapse. When this occurs, sleeve 434 collapses to accommodate the movement. Spring 408 is collapsed until pin 40 reaches the disengaged position as depicted in FIG. 11.

When the supply of pressurized air is cut off, spring 408 urges cylinder 398 and thus locking pin 40 back towards the engaged position pulling base 404 and sleeve 434 along with it. Substantially all of the elements of driver assembly 378 are protected from the weather and that a reliable driver assembly 378 is provided.

Figure 12:
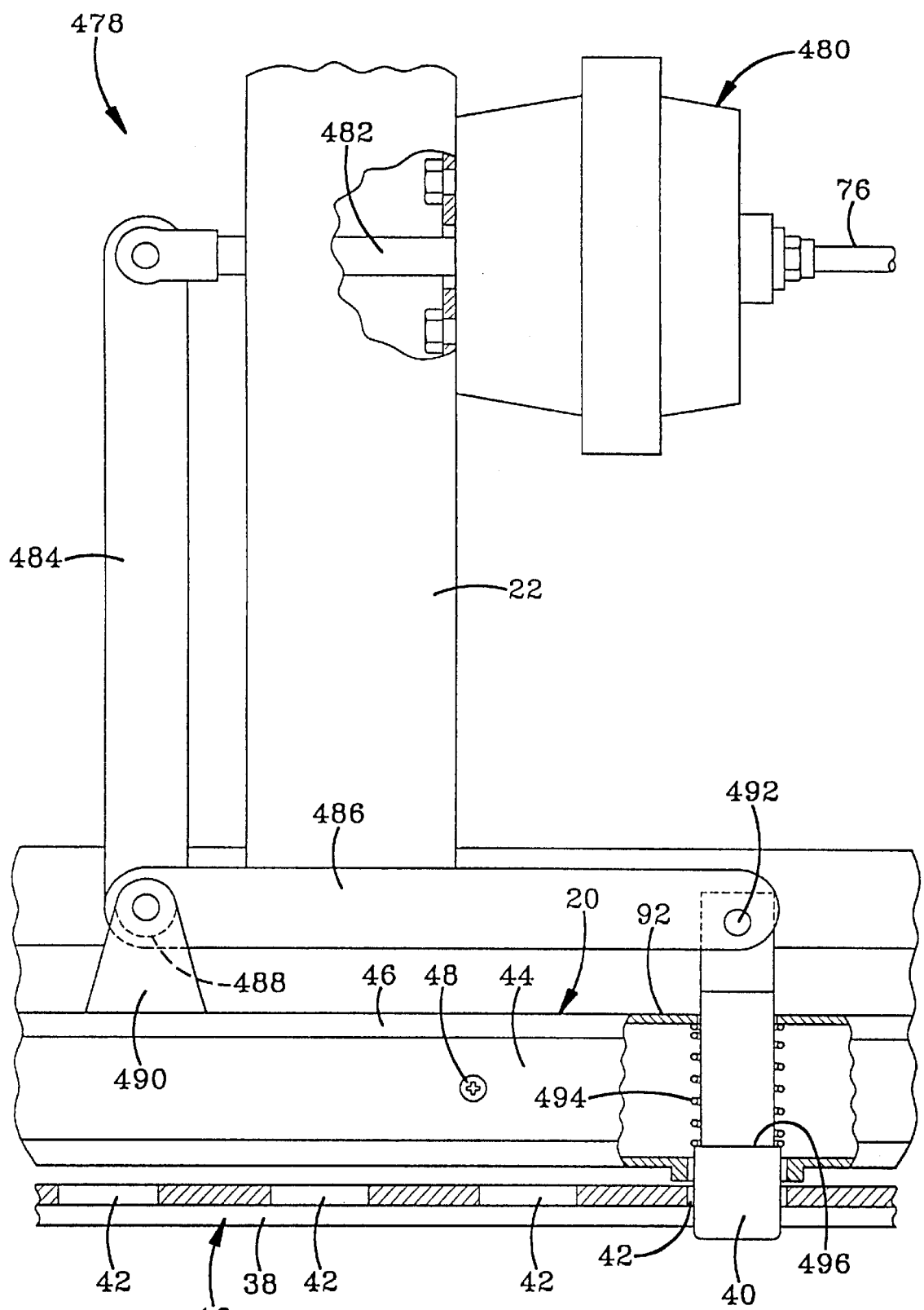
FIG. 12 is a plan view of a portion of the trailer frame depicted with the semitrailer removed for clarity depicting a third alternative embodiment of the present invention with the locking pin engaged.
Figure 13:
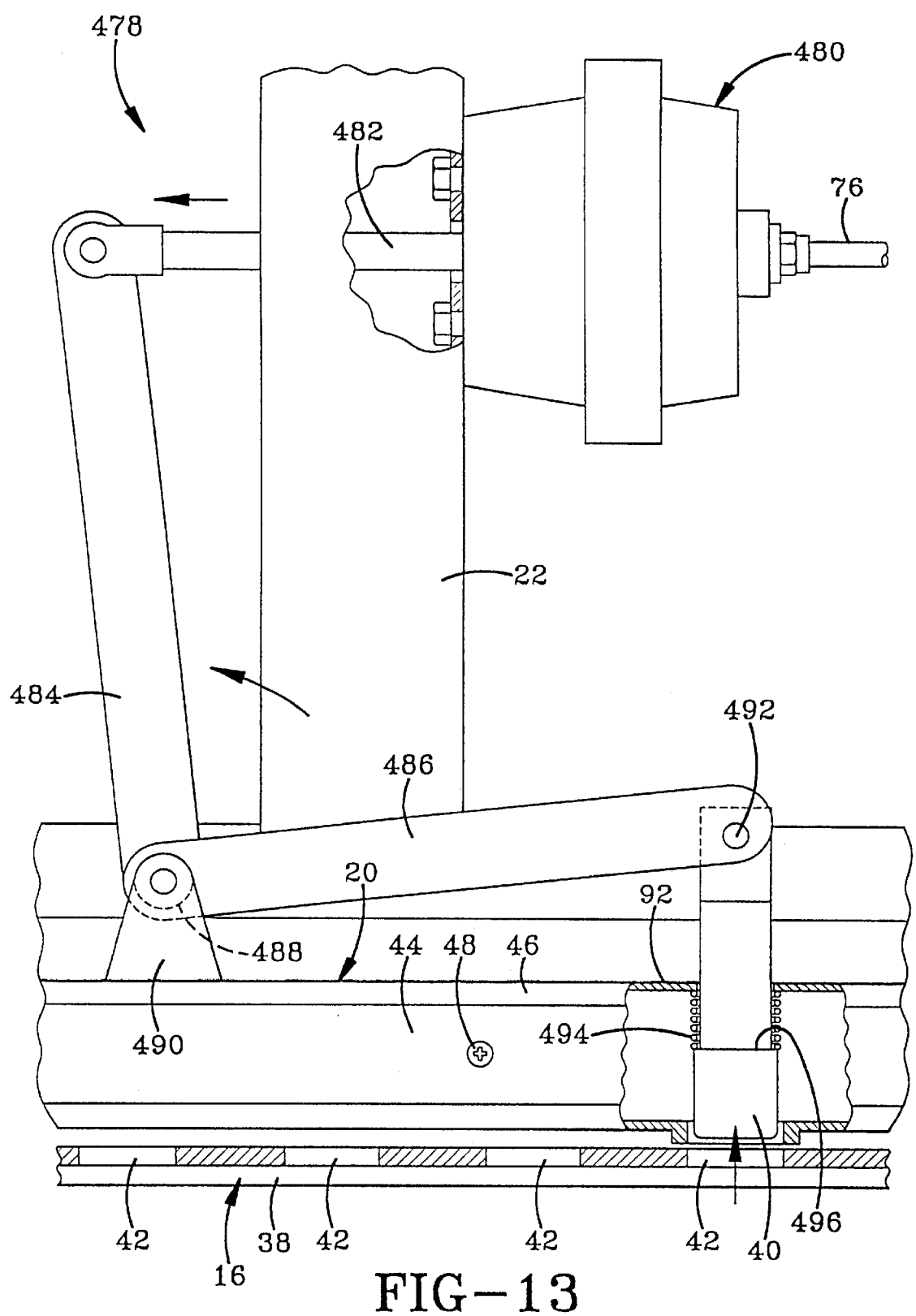
FIG. 13 is a plan view substantially similar to FIG. 12 depicting the locking pin in the disengaged position.

A fourth embodiment of the driver assembly of the present invention is indicated generally by the numeral 478 in FIGS. 12–14. Driver assembly 478 of the fourth embodiment includes a service chamber 480 that is in fluid communication with primary supply line 76. Although somewhat larger in size than a piston-cylinder assembly, a service chamber 480 may be configured to provide significantly more force than a small piston-cylinder assembly. Service chamber 480 includes an expandable chamber/spring arrangement (not shown) that is configured to force an output shaft 482 outwardly from service chamber 480 when pressurized air is supplied to service chamber 480 by primary supply line 76. Shaft 482 is pivotally attached to a first bar 484. First lever bar 484 is rigidly attached to a second lever bar 486 by a rod 488. Rod 488 is pivotally carried by a pair of brackets 490 that are, in turn, carried by frame 20. Locking pin 40 is pivotally attached to second lever bar 486 by appropriate means such as a second pin 492. A return spring 494 surrounds a portion of locking pin 40 and is disposed between inner wall 92 and a shoulder 496.

Locking pin 40 may be retracted to the disengaged position by activating service chamber 480 by supplying it with pressurized air. Such a supply causes shaft 482 to move outwardly causing first and second lever bars 484, 486 to pivot about the axis of rod 488. As may be seen in FIG. 13, this motion causes locking pin 40 to move inwardly to the disengaged position to compress return spring 494. When the supply of pressurized air is released, return spring 494 urges locking pin 40 back to the engaged position and resets service chamber 480. Of course, other lever arrangements may also be used to transfer the motion created by service chamber 480 to locking pin 40. For instance, a longer lever arm may be used to create more force at locking pin 40. However, a longer lever arm will require a longer movement of shaft 482 to fully retract locking pin 40. In another embodiment, a straight lever bar may be used with a single pivot.

It may thus be understood that the fourth embodiment of the driver assembly 478 provides a reliable mechanism for driving locking pin 40 between the engaged and disengaged positions. Driver assembly 478 also protects its elements from the weather as the working elements are enclosed by the service chamber 480 or the frame 20 of the semitrailer 10.

Accordingly, the improved operating system for slider locking pins is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the operating system for slider locking pins is constructed and used, the characteristics of the construction, and the advantageous new and useful results obtained; the new and useful structures, devices, elements, arrangements, parts, and combinations are set forth in the appended claims.

What is claimed is:

1. A semitrailer locking pin operating system adapted to be used with a trailer having a pair of rails having locking holes that are selectively slidably carried by a suspension frame, the system comprising:
    a source of air pressure;
    a main supply line in fluid communication with said source of air pressure;
    a valve in fluid communication with said main supply line, said valve movable between open and closed positions;
    at least two locking pins;
    a return spring associated with each of said locking pins, each of said return springs continuously forcing one of said locking pins into an engaged position;
    a locking pin driver assembly connected to each of said locking pins at a connection, said locking pin driver assembly actuated by said valve, wherein each of said locking pin driver assemblies include an expandable bladder in fluid communication with said valve, each of said expandable bladders overcoming one of said return springs when said valve is in said open position moving one of said locking pins to a disengaged position; and
    a protective covering substantially enclosing said return spring for preventing debris from inhibiting the operation of said semitrailer locking pin operating system.

2. A system according to claim 1 wherein said source of air pressure includes an air compressor and an air tank in fluid communication with said air compressor.

3. A system according to claim 2 further comprising an air pressure protection valve connected to said air tank and a main supply line connected to said air pressure protection valve and said valve.

4. A system according to claim 1 wherein said driver assembly comprises:
    a fixed bracket adapted to be connected to the suspension frame of the semitrailer;
    a traveling bracket attached to said locking pin;
    said expandable air bladder disposed between said traveling bracket and said fixed bracket.

5. A system according to claim 4 further comprising at least a primary supply line providing fluid communication between said expandable air bladder and said valve, said primary supply line being flexible.

6. A system according to claim 5 wherein said fixed bracket includes:
    a U-shaped portion disposed between a pair of feet, said feet adapted to be connected to the suspension frame;
    said traveling bracket including two opposed ends connected by a pair of opposed sides;
    one of said ends attached to said locking pin;
    said expandable bladder disposed between said U-shaped portion of said fixed bracket and the other of said ends of said traveling bracket.

7. The system according to claim 6 wherein said protective covering includes a second protective portion comprising said fixed and said traveling brackets substantially enclosing said valve and said locking pin driver assembly.

8. A system according to claim 6 wherein said U-shaped portion of said fixed bracket is disposed between said sides of said traveling bracket.

9. A system according to claim 8 wherein said return spring is disposed around said locking pin.

10. A system according to claim 9 wherein said locking pin defines a shoulder, said return spring engaging said shoulder and adapted to engage the suspension frame of the semitrailer.

11. The system according to claim 1 wherein said protective covering includes a first protective portion comprising a side rail substantially enclosing said return spring.

12. A semitrailer locking pin operating system adapted to be used with a trailer having a pair of rails having locking holes that are selectively slidably carried by a suspension frame, the system comprising:
    a source of air pressure;
    a main supply line in fluid communication with said source of air pressure;
    a valve in fluid communication with said main supply line, said valve movable between open and closed positions;
    at least two locking pins;
    a return spring associated with each of said locking pins, each of said return springs continuously forcing one of said locking pins into an engaged position;

a locking pin driver assembly connected to each of said locking pins at a connection, said locking pin driver assembly actuated by said valve; and a protective covering substantially enclosing said return spring for preventing debris from inhibiting the operation of said semitrailer locking pin operating system.

13. The system according to claim 12 wherein each of said locking pin driver assemblies have a piston and a shaft with the piston mounted on said shaft, said locking pin formed with a cylinder therein whereby at least a portion of the piston is disposed within the cylinder.

14. A system according to claim 13 wherein said shaft of said piston is adapted to be connected to the suspension frame.

15. A system according to claim 12 further comprising a base attached to said locking pin to form a chamber between said base, cylinder, and said piston, said chamber being in fluid communication with first valve; said shaft of said piston extending through said base of said cylinder.

16. A system according to claim 13 wherein said shaft of said piston is adapted to be connected to the suspension frame in a manner that accommodates skewed movement of said locking pin with respect to the frame.

17. A system according to claim 16 further comprising:

a pin attached to said shaft;

a spherical bushing carried by said pin;

a sleeve adapted to extend between the suspension frame and said spherical bushing; and a connector extending through said spherical bushing and said sleeve.

18. A system according to claim 17 further comprising an expandable and collapsible protection sleeve surrounding at least a portion of said shaft.

19. The system according to claim 18 wherein said protective assembly includes said cylinder and said protection sleeve.

20. A system according to claim 13 wherein said shaft defines an air supply passageway that partially provides fluid communication between said valve and said chamber.

21. A system according to claim 13 wherein said return spring is disposed within said cylinder in said locking pin.

* * * * *